F. O. WOODLAND.
WHEEL FOR MOTOR VEHICLES.
APPLICATION FILED DEC. 18, 1908.

1,031,763.

Patented July 9, 1912.

3 SHEETS—SHEET 1.

Witnesses—
Mander A. Maynard
Ella P. Plenus

Inventor.
Frank O. Woodland
By Chas. H. Burleigh
Attorney

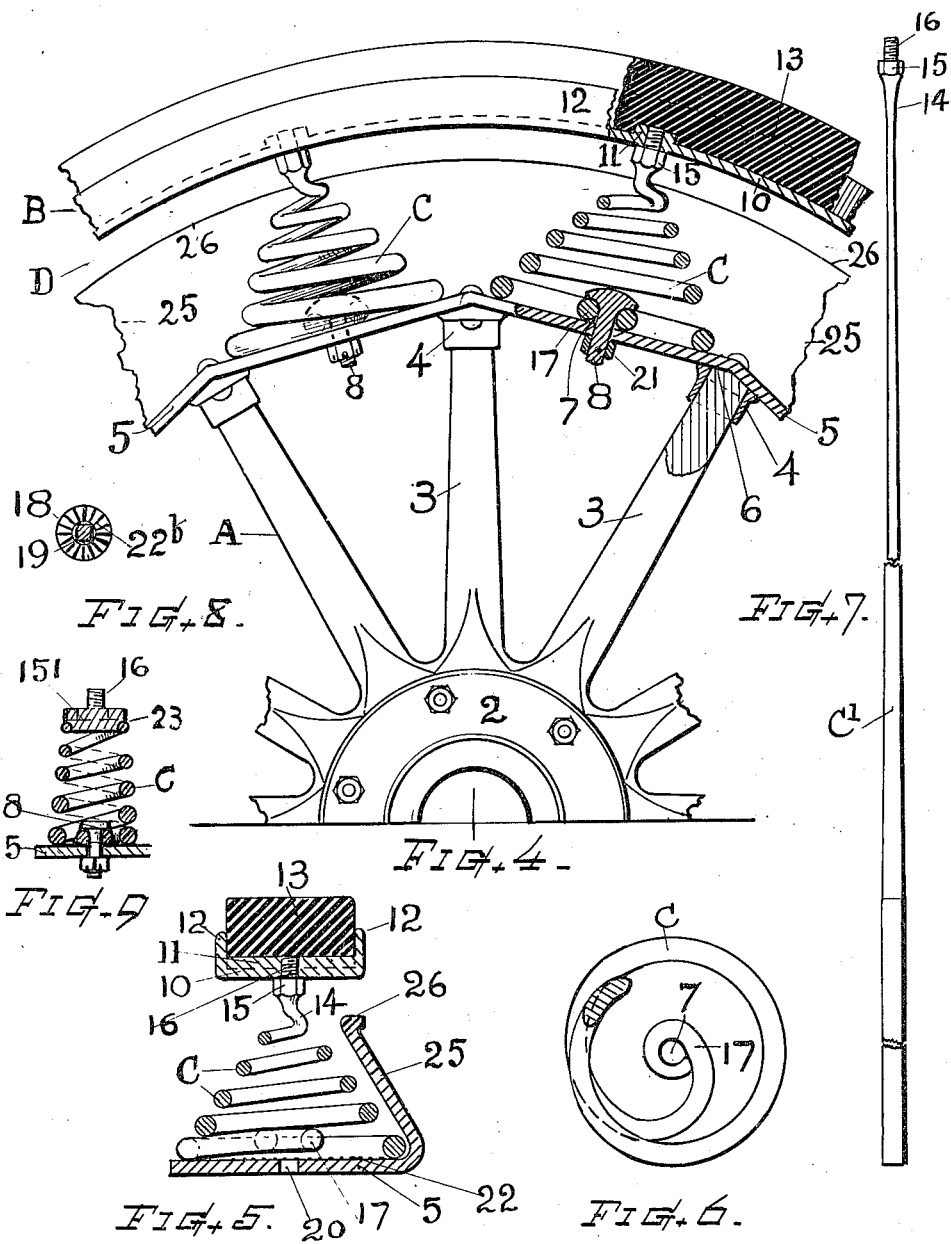

F. O. WOODLAND.
WHEEL FOR MOTOR VEHICLES.
APPLICATION FILED DEC. 18, 1908.
1,031,763.
Patented July 9, 1912.
3 SHEETS—SHEET 3.
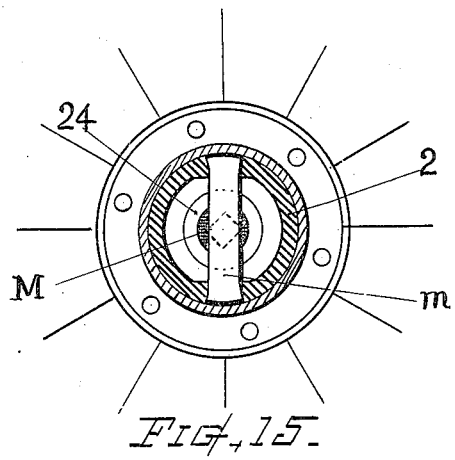
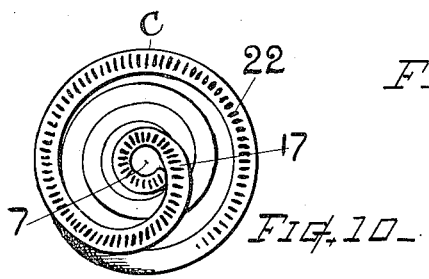
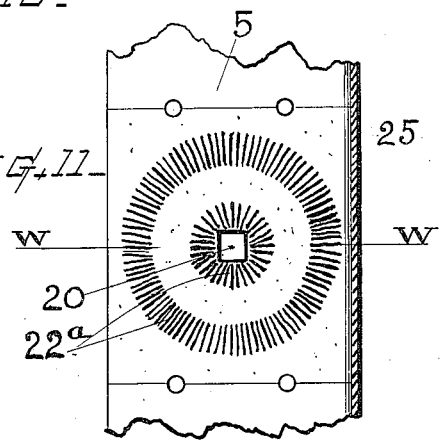
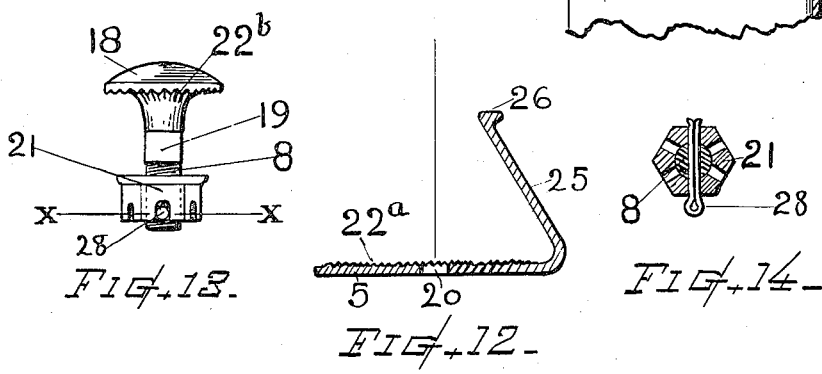

UNITED STATES PATENT OFFICE.

FRANK O. WOODLAND, OF WORCESTER, MASSACHUSETTS.

WHEEL FOR MOTOR-VEHICLES.

1,031,763.   Specification of Letters Patent.   Patented July 9, 1912.

Application filed December 18, 1908. Serial No. 468,248.

*To all whom it may concern:*

Be it known that I, FRANK O. WOODLAND, a citizen of the United States, residing at Worcester, in the county of Worcester and State of Massachusetts, have invented a new and useful Wheel for Motor-Vehicles, of which the following is a specification, reference being made therein to the accompanying drawings.
This invention relates to a wheel of novel construction, comprising a central wheel-section or body and an outer circumferential rim yieldably connected therewith by a system of springs of the character set forth;
the object being to provide an efficient and durable solid-tired elastic wheel for motor-cars and similar vehicles, and adapted for use either as a centrally driven traction-wheel, or as a traveling wheel; said wheel involving in its nature, construction and combination of parts, the features of invention or improvement which are more fully hereinafter explained; the particular subject matter claimed as of my invention being definitely specified and pointed out in the summary.

Figures 1, 3:
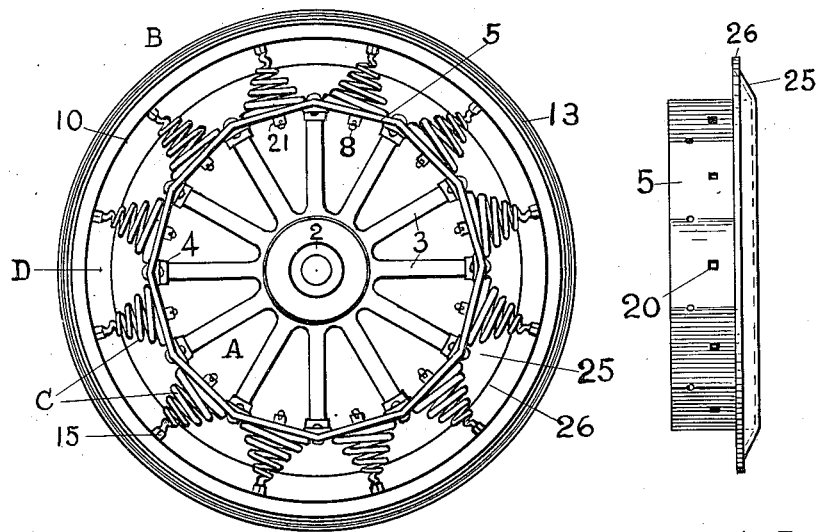
Figure 2:
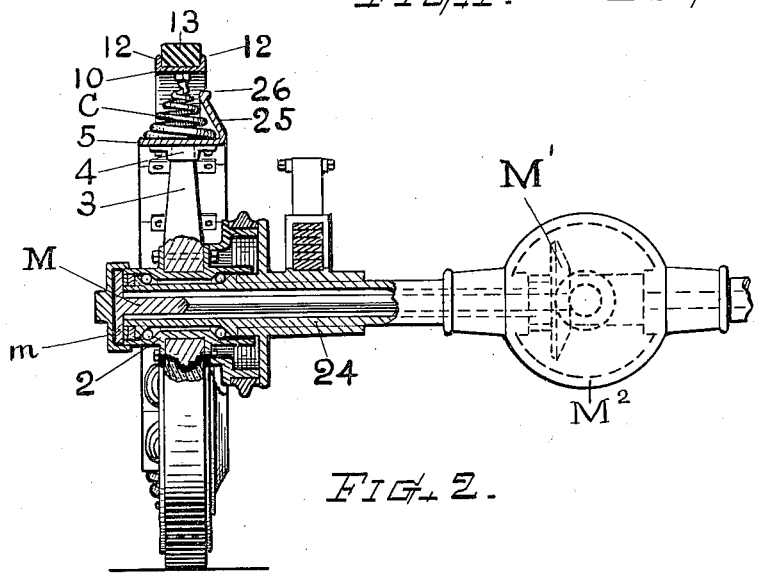

The accompanying three sheets of drawings illustrate my invention in a preferred form of embodiment.
Figure 1 represents a side view of the complete wheel. Fig. 2 is a vertical sectional view of the wheel in connection with the axle of a motor vehicle. Fig. 3 is a separate edge view of the seat member that surrounds the central wheel section. Fig. 4 is a fragmentary view, drawn to somewhat larger scale, and showing the construction in detail. Fig. 5 represents a cross section of the tire-supporting rim and the seat member, and one of the conical coiled springs with its base-attaching bolt removed. Fig. 6 is a plan view of the base coil of the spring. Fig. 7 is a shortened view of one of the tapered wires or rods from which the springs are formed. Fig. 8 is a bottom view of the spring-attaching bolt, as corrugated on the under surface of its head, and Fig. 9 shows a modification in the construction of the head of the spring.
Fig. 10 is a bottom view of one of the springs as made with a corrugated, roughened or knurled under surface. Fig. 11 is a portion of the seat-member showing one of the spring-seating facets, having a corrugated, roughened or knurled seating surface. Fig. 12 is a cross section at line W W on Fig. 11. Fig. 13 is a side view of the spring-attaching bolt, on a larger scale. Fig. 14 is a section of the bolt and its nut, at line X X on Fig. 13, and Fig. 15 is a cross-section at the end of the wheel hub, showing a driving means.

In the construction shown in the drawings the chief elements of the wheel consist of a central wheel-section or rotatable body portion A; an outer circumferential tire-supporting rim or felly B of greater diameter; and a series of spiral coil springs C disposed at intervals about said central wheel-section within the annular space D between the inner wheel-section and felly, and serving for connecting the inner and outer parts in the manner of yieldable spokes; and for sustaining said outer rim normally concentric with the axis, and for transmitting the driving torque from the central wheel-section to the outer rim.

The body or central wheel-section is preferably made with a hub 2, which may be of usual or any suitable construction; a series of radial spokes 3, of wood, metal or suitable material, having their inner ends rigidly supported within the hub, while their outer ends abut against a metallic seat-member-plate or ring 5 having on its inner face suitable sockets 4 within which the ends of the spokes 3 are respectively confined. The seat member is preferably a broad ring of polygon shape, with as many angles and straight facets as there are spokes in the wheel; which may be more or less as desired. The extremity of the spoke is best made oppositely beveled, as at 6, to fit firmly against the angle or inner surface of the seat-plate within the socket 4, or otherwise secured in a manner to give rigid thrust support for said seat-member, which is arranged concentric about the hub. The sockets 4 are preferably riveted to the plate 5.

The felly or outer rim is best formed of a circular metal channel-bar 10, with peripheral flanges 12, between which the tire 13 is confined, its inner face seated upon the body of the rim. Said tire is formed solid of semi-elastic rubber, or of any similar or approved material. This flanged rim 10 forms a comparatively stiff or non-bendable circle of sufficient strength to support, without material change of its contour, any load that may normally be applied thereto in the service for which the wheel is designed.

The interior of the tire-supporting rim 10 is of considerably greater diameter than the exterior face of the central wheel section, and within the annular space D, between the seat member 5 and rim 10, I arrange a series of outwardly expanding spiral springs C, preferably corresponding in number with the number of spokes, and disposed in radial relation seated upon the flat facets of the seat member 5, and forming the only connection between the central wheel-section and the outer rim; said springs supporting the outer rim normally concentric with the center of the wheel, but permitting a yielding action thereof under pressure or strain.

The springs are severally of similar construction, hence a description of one will apply to all. The spring C consists of a conically coiled tapered wire or metal rod $C^1$ (shown straight in Fig. 7), the larger convolutions and heavier portions of the rod being at the base of the spring, and the dimension of the coils and the size of the wire gradually decreasing toward the outer end or apex of the springs, as best shown in Figs. 1 and 7. At the outer end of the spring, beyond its small neck 14, the spring wire is shaped with a short gradual swell and a shouldered head 15 adapted for the application thereto of a wrench or spanner, and a projecting screw-threaded portion 16 that screws into a suitably threaded opening in the rim 10; said rim being preferably provided with a transverse reinforce 11 to give greater substance and strength for the screw attachment. As shown in the drawings, the conical coil is best made with a broad base or circumferential coil, and is regularly tapered to the neck or outer end of the spiral, the neck and threaded projecting end being approximately in alinement with the central axis of the spring; while the point of attachment to the outer rim is approximately at the apex of a cone represented by the exterior contour of the coils.

The springs C are best made of vanadium steel, or other suitable grade of metal having capacity for durability under constantly varying strains. The bottom coil of the spring is made to serve as a circumferential broad seating base for the spring, and its end is curled inward, as a volute (see Fig. 6) and formed into a central eye 7 suitable for receiving a bolt or fastening device 8 by which the spring is secured to the seat member. When forming the spring this volute portion and eye 7 are made to stand somewhat above the level or bottom plane of the first circumferential coil, as illustrated at 17 on Fig. 5, so that when the fastening bolt is inserted and tightened the spring tension of the attaching portions causes the circumferential coil at the base of the spring to hug closely down upon the seat; thereby giving a broad firm bearing upon the supporting member 5 from which the springs project, each as a yieldable cone or pyramidal structure, and carrying the outer rim or felly supported on their apexes or reduced outer ends, normally concentric with the central axis.

The degree of conical taper in the spiral spring coils can be made more or less, and the strength of the springs varied to meet the requirements of wheels designed for carrying light or heavy loads, or for giving more or less flexibility of spring action, as may be desired.

The bolt 8, for securing the spring to the seat member, is formed with a head 18 and neck to engage and fit the eye portion 7 of the spring; a square or non-cylindrical body portion 19 that passes through a correspondingly shaped opening 20 in the seat-member plate, and a threaded end to receive the nut 21 at the inner side of said plate, by which the spring is clamped firmly upon its seat. The nut is best provided with suitable locking means to prevent its working loose by the jar of the wheel when in use. A suitable locking means is illustrated in Figs. 13 and 14; the nut for the attaching bolt being slotted and a pin or cotter 23 inserted through the end of the bolt and engaging in the slot. In some instances, if so desired, the adjacent contacting surfaces of the spring coil and its seat-plate can be corrugated or knurled, as at 22 and $22^a$, (see Figs. 10, 11 and 12), to insure a more secure retention of such surfaces upon each other; or again, the under face $22^b$ of the attaching bolt 8, or the surface that contacts around the eye 7, can be ribbed or corrugated for like purpose.

As shown in Fig. 2 the hub 2 is mounted, with suitable bearings, to revolve upon the axle 24 of the motor vehicle; and suitable means is provided for applying the motive power thereto; in the present instance said means comprises a cross-headed shaft M, the cross-head m of which engages with notches or lugs formed in the end of the wheel-hub, while the other end of said shaft M is operatively connected with actuating gearing $M^1$ within the gear box $M^2$ that forms a part of the hollow axle 24. By this means power and motion can be transmitted in well known or suitable manner for revolving said hub and central wheel-section, from which the outer rim receives its motion through the agency of the series of conoidal coiled springs.

The weight of the vehicle and load, so far as borne by the respective wheel, is supported within the circumferential rim, wholly by the combined resistance of the series of springs C, which are individually variously subjected to compressing, elongating and transverse strains that are continually changing their direction and degree as the relative positions of the springs change from above to below the wheel center; and the peculiar conical structure and disposition of the springs and combined parts is designed to keep the circumferential rim, which connects at the apexes of the coil cones, within proper limits as respects the plane of the wheel, while the springs C severally readily and variably assume their proportional part of the stress and torque as the wheel rolls along the plane of its travel.

The seat member 5 is, in the present instance and preferably, provided with an outwardly projecting guard or flange 25 rigidly attached or integral with the side or seat portion of the body section, and terminating at its periphery with an offset-rim or edge 26 disposed at a suitable predetermined distance from the inner surface of the main rim, so as to guard against excessive displacement, but not contactable therewith under normal conditions and use. This flange 25 is of such diameter that in case the springs or outer rim should break or become displaced to an abnormal degree from any cause, the weight of the vehicle would be supported and prevented from falling to the ground, since, in case of breakage, the outer edge 26 of said flange or guard may serve as a supplemental wheel-rim upon which the travel can to some extent be sustained. The seat-member or rim 5, and the rim 10, may each be formed from sheet steel or wrought metal, stamped, swaged or rolled into the required shape, and can be of comparatively light weight.

The spring-rod or wire is best made with such a degree of taper that the spring when coiled therefrom will have a somewhat greater stiffness or resistive tension near its base than at the smaller coils near its apex or outer end. Hence the driving capacity of the springs for transmitting the rotative force, as well as the resistance to compressibility, is greater near the central wheel-section or hub of the wheel, which first receives the driving torque from the motor shaft, than at their outer ends and said springs, being of cone-shape, transmit the torque to the rim 10 with an elastic, but amply efficient potentiality accordingly as the driving force and resisting force of the travel may demand. The springs have a bracing, lateral, and endwise, resilience which permits the outer rim to yield to a limited extent in either direction, in relation to the central wheel-section as it encounters the roughness of the road, and to instantly regain its normal relation as the resistance is passed.

In case of breaking any of the springs while on the road, a spare spring can be quickly and conveniently substituted, since it is not necessary to even jack-up the weight of the car or vehicle to make such change. Removal of the nut 21 and bolt 8 will release the base of the spring, and its outer end 16 can then be readily unscrewed from the rim 10. The new spring can then be assembled by screwing its head into the rim and securing its base by inserting and tightening the bolt 8.

In the modification shown in Fig. 9 the head of the spring is formed of a metal block 151, united to the top coil of the spring-wire by autogenous welding, and having a threaded projection in alinement with the axis for connection with the felly.

I claim and desire to secure by Letters Patent—

1. A wheel for motor-vehicles, including a central body-section having a broad spring-supporting seat-plate about its exterior, an outer felly-rim, a series of tapered-rod springs disposed between and yieldably connecting said outer felly-rim and seat-plate; and a circumferential guard-flange upon said central body-section at one edge of said seat-plate, projecting outward alongside of but not in contact with said series of springs, its periphery being carried toward the central plane of the wheel and disposed within the circle of the outer felly rim at a predetermined distance therefrom, for the purpose set forth.

2. A wheel for motor vehicles and the like, comprising, in combination, a central wheel-section having a circumferential seat-member, an outer tire-supporting rim, a series of radially disposed outwardly tapered coiled springs having their respective larger ends secured to said seat-member, and their smaller ends secured to said tire-supporting rim and forming the connection between said parts, and an annular conoidally formed guard-flange attached to one edge of said seat-member and projecting toward said rim but terminating with an offset periphery at a position to be normally out of contact with said rim.

3. In a wheel of the class specified, a rim-supporting spring consisting of a spiral conical-coiled tapered rod, provided at its smaller end with a shouldered integral head and screw-threaded projection, and having a broad seating-base coil with an inwardly curled end forming a central eye for the reception of an attaching-bolt.

4. The combination, of the central wheel-section, its seat-plate member having corrugated or knurled spring-seating facets, the rigidly circular felly-rim having a circumferential tire-seat, yieldable rim-supporting springs, each consisting of a conical spiral coil of tapered rod, the taper of the rod and taper of the spiral coil being graded from the larger base-coil of the spring to the smaller end of the spiral, the base-coil having a corrugated surface for contact with the seat-facet, means for affixing the smaller end of said spring firmly into the felly-rim, at a point approximately coincident with the apex of the cone represented by the exterior contour of the coil, and means securing the base of said spring to the seat-plate, with the corrugated surfaces in rigid contact, substantially as set forth.

5. In a wheel for motor vehicles, in combination with a central wheel-section, and a non-flexible outer rim; of supplemental spring spokes uniting said wheel-section and rim, each consisting of a spiral conically-coiled tapered rod, the base of the spring having a broad circumferential seating-coil including the heavier portion of such rod, and a central bolt-receiving eye that is primarily at a higher plane than the seating-coil, a seat for said spring, and an attaching-bolt provided with a head for engaging said eye, and corrugated or knurled contact surfaces that are closed together by the tightening of said bolt for retaining said spring.

6. In a motor vehicle wheel, the combination, with a central wheel-section, a peripheral seat-plate thereon, and a spring-connected tire-supporting outer rim; of a series of springs severally having a broad seating circumferential base-coil terminating with an inner curl and central eye, said central eye being made to stand above the level of the plane of said circumferential base-coil, for the purpose set forth.

7. In a wheel of the class described, the central wheel-section, comprising a hub, radial spokes fixed therein, a rigid circumferential seat-plate provided with sockets supported upon the outer ends of said spokes, flat seating facets and an outwardly projecting guard provided with a peripheral edge adapted for a tread, in combination with a circular rigid surrounding tire-supporting felly having threaded holes therein, a series of springs having threaded tips screwed into said felly, the broad bases of the springs supported upon the flat seat facets, and secured to said seat-plate by a bolt and nut, said springs being formed of lighter weight near their outer ends than at their inner ends, all substantially as set forth.

8. In a wheel of the class described, in combination with a spring-supported outer rim, springs therefor, and an inner wheel-section, carrying said springs and outer rim; an annular side guard fixed to said inner wheel section and having a peripheral edge adapted for a wheel-tread, disposed near but normally out of contact with the outer rim.

9. In a wheel of the class described, in combination with a permanently circular tire-supporting rim, a central wheel-section having a bearing hub, and means for yieldably connecting said rim and wheel-section; of an annular guard fixed upon and extending beyond the periphery of the inner wheel-section in conical form, and having an offset peripheral edge.

10. In a wheel of the class described, in combination, with an inner wheel-section, rim-supporting springs, and outer rim; the spring-seating peripheral member of said inner wheel-section, consisting of a sheet metal structure comprising a polygonal circumferential plate provided at one edge with an integral outwardly projecting forwardly inclined flange having a backwardly offset circumferential lip, for the purpose set forth.

11. In a wheel of the class described, in combination with an inner wheel-section, and a series of springs arranged in radial relation upon the peripheral member of said wheel-section; a tire-supporting rim formed of a complete channel-bar circle, with outwardly projecting flanges and having integral transverse reinforce bars upon the outer side of its web and threaded openings therein, the ends of the springs being formed with wrench-receiving heads and threaded tips, and screwed into the threaded openings in said rim and reinforce bars, in the manner set forth.

Witness my hand this 17th day of December, 1908.

FRANK O. WOODLAND.

Witnesses:
 CHAS. H. BURLEIGH,
 A. G. DAVIS.